United States Patent Office 3,223,721
Patented Dec. 14, 1965

3,223,721
1-(4-BROMOPHENYL), 3-METHOXY, 3-METHYL-UREA
Henry Martin, Basel, Hans Aebi, Riehen, and Ludwig Ebner, Stein, Aargau, Switzerland, assignors to Ciba Limited, Basel, Switzerland, a Swiss company
No Drawing. Filed Feb. 16, 1965, Ser. No. 433,155
Claims priority, application Switzerland, May 6, 1961, 5,336/61
1 Claim. (Cl. 260—453)

This is a continuation in part of our application Serial No. 191,442, filed May 1, 1962.

The present invention relates to the new compound of the formula

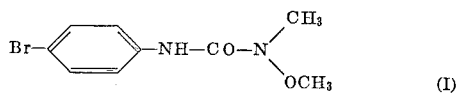

(I)

This compound is an excellent agent for combating weeds and, depending on the concentration at which it is used can be applied as herbicide having a total or a selective action.

The compound of the above Formula I is also highly effective against harmful microorganisms, e.g. harmful fungi, more especially phytopathogenic fungi.

The invention also provides preparations for combating undesirable plant growth, and preparations for combating harmful microorganisms, e.g. harmful fungi more especially phytopathogenic fungi, which comprise as an active substance the compound of the above Formula I and an inert carrier, a solvent, a diluent, an emulsifier, a dispersing agent, a wetting agent, an adhesive agent, a fertilizer, a fungicide, a bactericide, a nematocide, an insecticide or another herbicide.

The active substance may be used in an emulsified, dispersed or dissolved form or in a dusting preparation.

For preparing solutions suitable for spraying as such there may be used, for example, organic solvents boiling above 100° C., e.g. mineral oil fractions boiling above 100° C., such as diesel oil or kerosene, or coal tar oils or oils of vegetable animal origin, or hydrocarbons, such as alkylated naphthalenes, tetrahydronaphthalene, if desired, with the use of xylene mixtures, cyclohexanols, ketones, or chlorinated hydrocarbons, such as tetrachlorethane, trichlorethylene or tri- or tetra-chlorobenzenes.

As preparations that can be diluted with water to yield aqueous liquors for application as such there may be mentioned emulsion concentrates, pastes or wettable powders. As emulsifying or dispersing agents there are used non-ionic products, such as condensation products of aliphatic alcohols, amines or carboxylic acids containing a hydrocarbon radical having 10 to 30 carbon atoms with ethylene oxide, such as a condensation product of octadecyl alcohol with 25 to 30 mols of ethylene oxide or of soya bean oil fatty acid with 30 mols of ethylene oxide or of commercial oleylamine with 15 mols of ethylene oxide or of dodecyl mercaptan with 12 mols of ethylene oxide. As anionic emulsifying agents there may be mentioned the sodium salt of dodecyl alcohol sulfuric acid ester, the sodium salt of dodecyl-benzene sulfonic acid, the potassium or triethanolamine salt of oleic acid or of abietic acid or of a mixture of these acids, or the sodium salt of a petroleum sulfonic acid. As cationic dispersing agents there may be used quaternary ammonium compounds, such cetyl-pyridinium bromide or dihydroxy-ethyl-benzyl-dodecyl-ammonium chloride.

As solid carriers for making dusting or strewing powders there may be used talcum, kaolin, bentonite, calcium carbonate or calcium phosphate, or carbon cork meal or wood meal or other materials of vegetable origin. It is very advantageous to make up the preparations in a granulated form. The preparations in their various forms may also have incorporated therewith in the usual manner substances that improve their dispersibility, adhesion, resistance to rain or penetrating power, such as fatty acids, resins, glue, casein or, for example, alginates. The preparations that have a selective action may also be used in conjunction with, for example, in admixture with a fertilizer.

The following examples illustrate the invention:

EXAMPLE 1

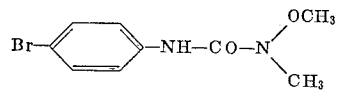

27 grams of N-phenyl-N'-methoxy-N'-methyl-urea are dissolved in 100 cc. of glacial acetic acid, 12.3 grams of anhydrous sodium acetate are added, and the bromination is carried out at 70° C. with 26.3 grams Br₂ in glacial acetic acid.

The yield of crude N-4-bromophenyl-N'-methyl-N'-methoxy-urea is 34 grams. The crude product melts at 91 to 94° C., and, when recrystallized from cyclohexane, the product melts at 95 to 96° C. N-4-bromophenyl-N'-methyl-N'-methoxy-urea obtained by a known method from para-bromophenyl isocyanate and O:N-dimethyl-hydroxylamine melts at 95.5 to 96° C. A mixture of the latter with the compound prepared as described above melts at 94.5 to 95.5° C.

*Analysis.*—$C_9H_{11}O_2N_2Br$: Calculated: C, 41.72%; H, 4.28%; Br, 30.84%. Found: C, 41.89%; H, 4.43%; Br, 30.61%.

EXAMPLE 2

(a) To 10 grams of the compound described in Example 1 are added 2 grams of sulfite cellulose waste liquor and 100 cc. of water, and the mixture is then subjected to intense grinding, to yield a stable dispersion of fine particle size, which contains the compound mentioned above and which may be diluted as required with water.

(b) To 50 parts of the compound of the Formula I are added 40 parts of kaolin (bolus alba), 3.5 parts of a condensation product of 1 mol of para-tertiary octylphenol with 8 mols of ethylene oxide, 1.5 parts of heptadecenyl-benzimidazole sulfonate and 5 parts of finely divided SiO₂; the mixture is then subjected to intense grinding, to yield a stable dispersion of fine particle size which may be diluted as required with water.

EXAMPLE 3

Flower pots were filled with earth in a greenhouse and seeds of the following plants were sown therein: *Avena sativa, Setaria italica, Dactylis glomerata, Sinapis alba, Medicago sativa, Lepidium sativum* and *Calendula chrysantha.*

Two days after sowing, the flower pots were treated with the dispersion described in Example 2(a). The dispersion was applied at the rate of 10 kg. of active substance per hectare. 4 weeks later the test plants which had been treated with the dispersion were dead or almost dead.

EXAMPLE 4

The seeds of the following plants were sown in flower pots in a greenhouse: *Avena sativa, Setaria italica, Dactylis glomerata, Sinapis alba, Medicago sativa, Lepidium sativum* and *Calendula chrysantha.* 10 to 14 days after sowing the plants were treated with spraying liquors prepared from the dispersion described in Example 2(a), the dispersions being applied in each case at the rate of 10 kg. of active substance per hectare. All the test plants were dead or nearly dead 2 to 3 weeks after the treatments.

EXAMPLE 5

Aqueous dilutions of the dispersion according to Example 2(b) were applied as sprays at rates decreasing from 8 to 0.25 pounds of active substance per acre to cultures of rice plants (paddy rice) in the following manner:

(1) Pre-plant soil incorporation. (Harrowed into the soil two days before the rice was sown.)
(2) Preemergent application (spraying of the field 1 day after the sowing of the rice).

Evaluation

In the case of (1): 7 weeks after the treatment.
In the case of (2): 7 weeks after the treatment.

Results

At the time of the evaluation an untreated control field was heavily infested with jungle-rice (Panicum) as the only weed present. In the case of the test fields treated according to the methods (1) and (2) set forth above, it was observed that at the rate of 0.5 pound per acre of active substance the rice cultures were completely freed from the jungle rice and that the rice tolerated 8.0 pounds per acre of active substance without being damaged.

EXAMPLE 6

(a) From the compound described in Example 1 a solution of 1 percent by weight in propylene glycol was prepared and tested against harmful fungi as described below:

(b) The following test-organisms were used:

*Rhizopus nigricans,*
*Alternaria solani,*
*Rhizoctonia solani.*

An aqueous beerwort solution of 10% strength was used as nutrient medium of which 9.5 ml. were put into a series of test-tubes. 0.5 ml. of the solution set forth above under (a) was added to the 9.5 ml. of nutrient medium in each case. In this way solutions were obtained containing 500 p.p.m. each of active substance. These were diluted with beerwort solution to lower concentrations of active substance (250; 125 and 60 p.p.m.). The resulting solutions of different concentrations were inoculated with 1 drop of a spore suspension of the above mentioned test organisms, and incubated for 8 days at 24° C. The limit concentration at which no growth could be observed in each of the test organisms was then determined. The results are shown in the following table:

Test organism:

| | Limit concentration at which inhibition of growth occurs, p.p.m. |
|---|---|
| Rhizopus nigricans | 125 |
| Alternaria solani | 250 |
| Rhizoctonia solani | 60 |

The effective amounts of active compound set forth above do not cause any phytotoxic effects on test plants treated with them, e.g. celery plants.

What is claimed is:
The compound of the formula

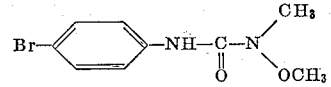

References Cited by the Examiner
UNITED STATES PATENTS

| | | | |
|---|---|---|---|
| 2,655,447 | 10/1953 | Todd | 260—553 |
| 2,960,534 | 11/1960 | Scherer et al. | 260—553 |

NICHOLAS S. RIZZO, *Primary Examiner.*

HENRY R. JILES, *Examiner.*

Notice of Adverse Decision in Interference

In Interference No. 95,460 involving Patent No. 3,223,721, H. Martin, H. Aebi and L. Ebner, 1-(4-BROMOPHENYL), 3-METHOXY, 3-METHYL-UREA, final judgment adverse to the patentees was rendered Oct. 15, 1968, as to claim 1.

[*Official Gazette August 22, 1972.*]